United States Patent
Riggins, III

(10) Patent No.: US 6,195,090 B1
(45) Date of Patent: Feb. 27, 2001

(54) INTERACTIVE SPORTING-EVENT MONITORING SYSTEM

(76) Inventor: A. Stephen Riggins, III, 14 Amato, Mission Viejo, CA (US) 92692

( * ) Notice: Subject to any disclaimer, the term of this patent is extended or adjusted under 35 U.S.C. 154(b) by 0 days.

(21) Appl. No.: 09/028,439

(22) Filed: Feb. 24, 1998

Related U.S. Application Data

(60) Provisional application No. 60/039,268, filed on Feb. 28, 1997.

(51) Int. Cl.[7] ............................ G06F 3/00; H04N 7/10; H04N 1/02; G08C 15/06
(52) U.S. Cl. ................................ 345/327; 348/6; 348/10; 348/478; 455/6.2; 455/6.3; 455/66; 340/870.03; 340/870.07; 340/870.11
(58) Field of Search ..................................... 348/476, 478, 348/6, 9, 1, 10; 455/66, 2, 6.3, 6.2, 3.1; 345/327; 340/870.01, 870.02, 870.03, 870.07, 870.11

(56) References Cited

U.S. PATENT DOCUMENTS

| | | |
|---|---|---|
| 3,678,189 | 7/1972 | Oswald . |
| 3,890,463 | 6/1975 | Ikegami et al. . |
| 3,975,585 | 8/1976 | Kirk, Jr. et al. . |
| 4,183,056 | 1/1980 | Evans et al. . |
| 4,751,642 | 6/1988 | Silva et al. . |
| 4,771,344 | 9/1988 | Fallacaro et al. . |
| 4,814,711 * | 3/1989 | Olsen et al. .......................... 324/331 |
| 4,849,817 | 7/1989 | Short . |
| 4,949,169 | 8/1990 | Lumelsky et al. . |
| 5,056,106 | 10/1991 | Wang et al. . |
| 5,065,321 | 11/1991 | Bezos et al. . |
| 5,136,375 | 8/1992 | Citta et al. . |
| 5,173,856 * | 12/1992 | Purnell et al. ................... 364/424.04 |
| 5,216,503 | 6/1993 | Paik et al. . |
| 5,223,930 | 6/1993 | Zato . |
| 5,243,415 | 9/1993 | Vance . |
| 5,249,050 | 9/1993 | Zato . |
| 5,285,272 | 2/1994 | Bradley et al. . |
| 5,301,023 | 4/1994 | Zato . |
| 5,343,239 | 8/1994 | Lappington et al. . |
| 5,371,548 | 12/1994 | Williams . |
| 5,406,324 | 4/1995 | Roth . |
| 5,423,555 | 6/1995 | Kidrin . |
| 5,430,799 | 7/1995 | Katznelson . |

(List continued on next page.)

Primary Examiner—John W. Miller
(74) Attorney, Agent, or Firm—Stout, Uxa, Buyan & Mullins, LLP; Donald E. Stout

(57) ABSTRACT

An interactive sporting event monitoring system includes a determiner for determining whether video blanking interval data is present in a selected television channel, and a decoder for decoding video blanking interval data from the selected television channel. The video blanking interval data from the selected television channel comprises a number of channels of sporting-event audio information, and the decoder associates each of the plurality of channels of sporting-event audio information with a corresponding channel identifier. Each channel identifier distinguishes a corresponding channel of sporting-event audio information from other channels of sporting-event audio information. The interactive sporting event monitoring system further includes a user input for accepting a user-specified channel identifier from a user, and a monitor for placing the channel of sporting-event audio information that the user desires to monitor in a format to facilitate monitoring thereof by a user. The video blanking interval data may further include telemetry data.

36 Claims, 8 Drawing Sheets

U.S. PATENT DOCUMENTS

| | | | |
|---|---|---|---|
| 5,522,018 | * | 5/1996 | Takeda et al. ......................... 395/122 |
| 5,523,794 | | 6/1996 | Mankovitz et al. . |
| 5,532,735 | | 7/1996 | Blahut et al. . |
| 5,543,852 | | 8/1996 | Yuen et al. . |
| 5,548,637 | | 8/1996 | Heller et al. . |
| 5,552,824 | | 9/1996 | DeAngelis et al. . |
| 5,555,025 | | 9/1996 | McArthur . |
| 5,614,955 | * | 3/1997 | Rackman ............................. 348/487 |
| 5,666,101 | * | 9/1997 | Cazzani et al. ................... 340/323 R |
| 5,687,734 | | 11/1997 | Dempsey et al. . |
| 5,689,431 | * | 11/1997 | Rudow et al. .................... 364/449.7 |
| 5,714,997 | | 2/1998 | Anderson . |
| 5,724,091 | | 3/1998 | Freeman et al. . |
| 5,731,788 | * | 3/1998 | Reeds ................................... 342/357 |
| 5,751,806 | * | 5/1998 | Ryan ......................................... 380/9 |
| 5,761,602 | * | 6/1998 | Wagner et al. ........................ 455/3.1 |
| 5,812,937 | * | 9/1998 | Takahisa et al. ........................ 455/66 |
| 5,845,088 | | 12/1998 | Lewis . |
| 5,845,251 | | 12/1998 | Case . |
| 5,850,352 | | 12/1998 | Moezzi et al. . |
| 5,860,862 | | 1/1999 | Junkin . |
| 5,865,624 | * | 2/1999 | Hayashigawa ......................... 434/66 |
| 5,892,508 | | 4/1999 | Howe et al. . |
| 5,892,536 | | 4/1999 | Logan et al. . |
| 5,894,320 | | 4/1999 | Vancelette . |
| 5,896,555 | | 4/1999 | Yoshinobu . |
| 5,903,262 | | 5/1999 | Ichihashi et al. . |
| 5,931,908 | | 8/1999 | Gerba et al. . |
| 6,020,851 | * | 2/2000 | Busack ................................. 342/457 |

* cited by examiner

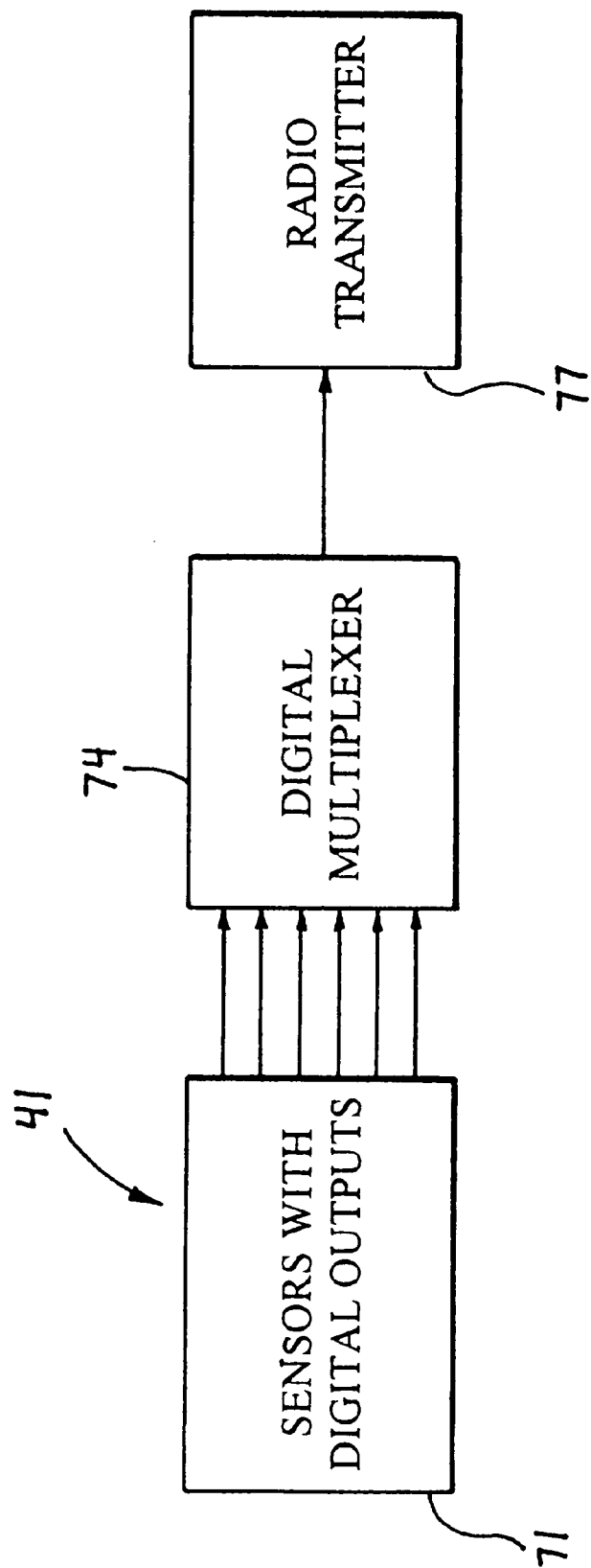

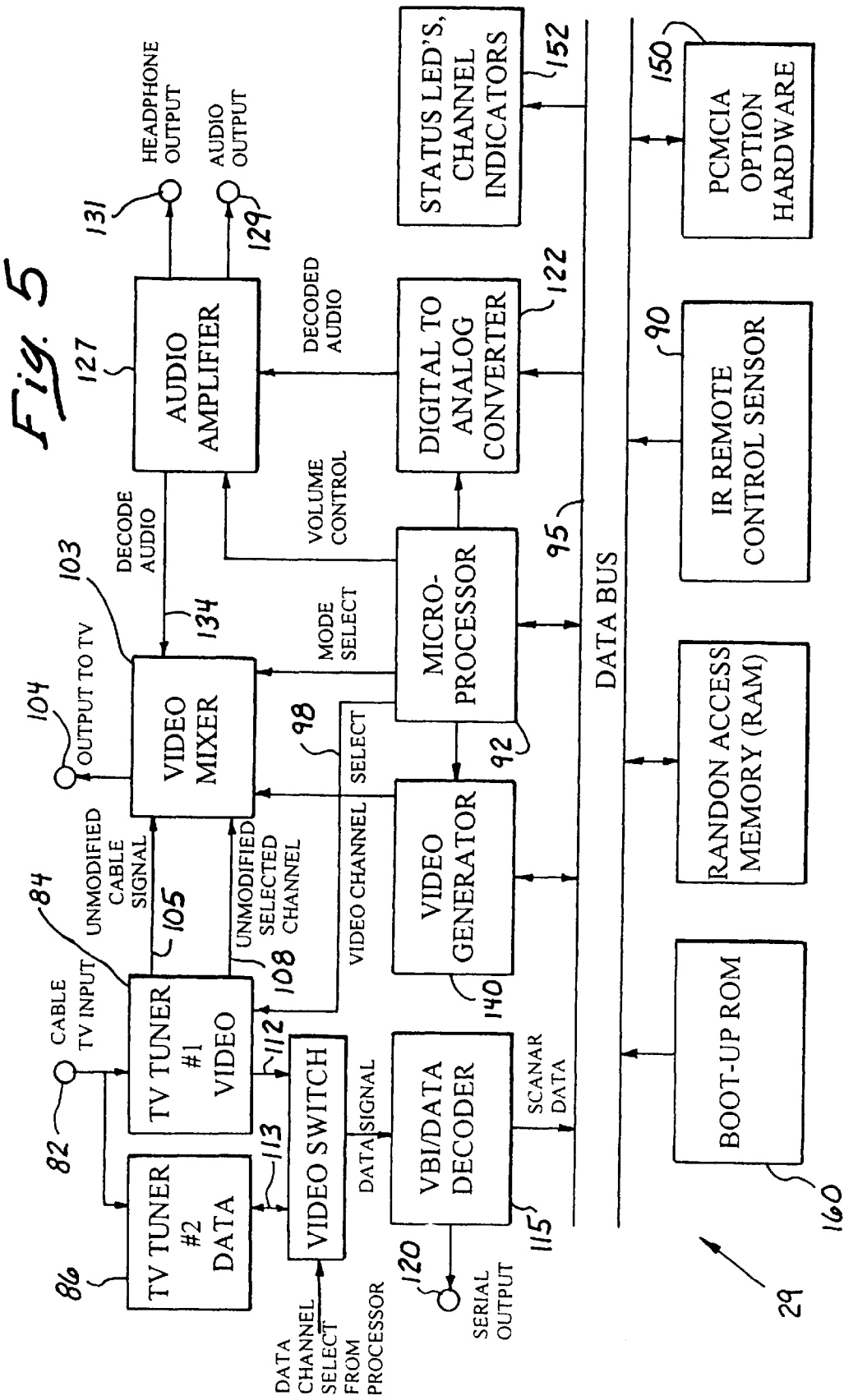

INTERACTIVE SPORTING-EVENT MONITORING SYSTEM

This application claims the benefit of U.S. Provisional Application No. 60/039,268, filed Feb. 28, 1997, which is commonly owned and the contents of which are expressly incorporated herein by reference.

BACKGROUND OF THE INVENTION

1. Field of the Invention

The present invention relates generally to television broadcasts systems and, more particularly, to interactive sporting-event broadcast and monitoring systems.

2. Description of Related Art

Automobile racing has become a very popular spectator sport in both the United States and overseas. The increase in popularity of automobile racing can be attributed in part to the coverage provided by broadcast television stations, which have brought the thrill and excitement of live automobile racing events into the homes of racing enthusiasts.

In a typical automobile racing event, the driver of each racing automobile is radio linked to his or her corresponding crew. Spectators at the actual sporting event commonly carry hand-held programmable UHF scanner radio receivers, for monitoring the UHF radio audio transmissions between the various drivers and crews. Each race team typically communicates on a specific UHF radio channel. The spectator programs the various UHF radio channels on his or her hand-held programmable UHF scanner radio receiver. The spectator can monitor all of the UHF radio channels sequentially in a scan mode or, alternatively, can hold on a single UHF radio channel. The spectator at the automobile racing event is thus able to determine the monitoring format according to his or her individual preferences.

By monitoring these UHF radio transmissions, the spectator attending the event can follow particular teams closely, get an appreciation for race strategy and, in general, get more involved in the automobile racing event. The monitoring of the UHF radio transmissions by the spectator adds another dimension to the automobile racing event, as compared to merely watching the event, by providing additional information to the spectator. Monitoring of the UHF radio transmissions by the spectator allows the spectator to become actively involved with the automobile racing event and the race strategy associated therewith.

In addition to the UHF radio audio transmissions, which generally comprise communications between the driver and his or her crew, race teams also commonly receive telemetry data from the driver's race car. Telemetry data is transmitted on UHF radio channels in a real-time format from the race car to the crew to enable analysis of machine and driver performance. The telemetry data typically comprises key information including, speed, engine revolutions-per-minute (rpm), lateral acceleration, brake movement, and throttle movement information corresponding to a particular automobile.

A television broadcasting team will commonly operate on-site at a sporting event to facilitate broadcasting of the sporting event. The television broadcasting team receives and monitors the UHF radio audio transmissions. Occasionally, the television broadcasting team will simultaneously broadcast a UHF radio audio transmission with the video broadcast for the home viewer. Additionally, telemetry data on UHF radio channels is occasionally presented in graphical format by the television broadcasting team to allow the television viewers to monitor real-time speeds, engine rpm, lateral acceleration, brake movements, and throttle movements of a particular driver on their television sets.

The infrequent forwarding of UHF radio audio information to the television viewers at home is no substitute for the hand-held programmable UHF radio scanner radio receivers used by spectators at the sporting event. Nor is the infrequent, limited forwarding of telemetry data to the television viewer adequate to provide the viewer with an optimal interactive experience. Although the television viewer may occasionally receive a small exposure to the UHF radio audio and/or telemetry data transmissions corresponding to a driver, the television viewer is unable to select between and continuously monitor these transmissions and, further, is unable to monitor transmissions corresponding to more than one driver.

SUMMARY OF THE INVENTION

The interactive monitoring system of the present invention receives UHF radio audio transmissions corresponding to all of the automobile drivers at the automobile racing event, and displays information relating to each UHF radio audio transmission on a viewer's television. The viewer can scan, hold or directly select any one of the UHF radio audio transmissions at any time, in accordance with the user's individual preferences. Thus, according to the present invention, the UHF radio audio transmissions are available to the viewer in the same way in which they are available to the spectator attending the automobile racing event.

The interactive monitoring system of the present invention also receives telemetry data corresponding to all of the transmitting teams at the racing event. The telemetry data is graphically depicted in real-time on the viewer's television, and the user can select between the telemetry data corresponding to the different drivers. The user can scan, hold, or directly select any telemetry display for viewing. Similarly, and at the same time, the user can scan, hold, or directly select any UHF radio audio transmission for audio monitoring. The viewer can, for example, listen to a UHF radio audio transmission corresponding to a first race team and, at the same time, display telemetry data corresponding to a second race team.

According to one aspect of the present invention, a data collection station comprises a first plurality of UHF radio receivers for continuously and simultaneously receiving audio data from a corresponding plurality of UHF radio transmitters, and a second plurality of telemetry data receivers for continuously and simultaneously receiving telemetry data from a corresponding plurality of telemetry data transmitters. The data collection station further comprises a data router operatively coupled to both the first plurality of UHF radio receivers and the second plurality of telemetry data receivers. The data router continuously receives both the audio data (from the UHF radios) and the telemetry data from the first plurality of UHF radio receivers and the second plurality of telemetry data receivers. The data router continuously routes the audio data and the telemetry data to a broadcasting facility. The data collection station is for use at a sporting event having a plurality of contestants, and the number of UHF radio receivers and the number of telemetry data receivers is each equal to the number of contestants in the sporting event.

According to another aspect of the present invention, a data collection station is for use at a sporting event having a plurality of contestants. The data collection station comprises a plurality of telemetry data receivers corresponding to the plurality of contestants at the sporting event. All of the telemetry data receivers continuously and simultaneously receive telemetry data from a corresponding plurality of telemetry data transmitters corresponding in number to the plurality of contestants. A local global positioning system transmitter is positioned near the sporting event to enable Higher Precision Global positioning system information. The data router receives the telemetry data, codes it to the particular race car, digitizes, multiplexes all the individual race car signals and routes the telemetry data to a broadcasting facility. A global positioning system receiver on board each race car, receives global positioning system information from satellites and from a local global positioning system transmitter. The telemetry data comprises speed data, position data, magnetic heading data, engine rpm data, lateral acceleration data, throttle position data, brake on/off data, and gear data.

An interactive sporting event monitoring system (at home decoder unit) of the present invention includes tuning means for selecting a television channel from a broad-band cable television signal, and determining means for determining whether relevant video blanking interval data is present in the selected television signal. The interactive sporting event monitoring system further includes decoding means for decoding video blanking interval data from the selected television signal. The video blanking interval data includes a plurality of channels of audio information, and the decoding means associates each of the plurality of channels of audio information with a corresponding channel identifier (that relates to the race car number). Each channel identifier distinguishes a corresponding channel of audio information from other channels of audio information of the plurality of channels of audio information. The interactive sporting event monitoring system further includes a user input for accepting a user-specified channel identifier from a user, and monitoring means for placing the channel of audio information that the user desires to monitor in a format to facilitate monitoring thereof by a user. The tuning means can be for selecting a single television channel from a broad-band cable television signal or can be for selecting both a first television channel and a second television channel from a broad-band cable television signal, or satellite signal.

In another aspect of the present invention, an interactive sporting event monitoring system includes determining means for determining whether video blanking interval data is present in a selected television channel, and decoding means for decoding video blanking interval data from the selected television channel. The video blanking interval data from the selected television channel comprises a plurality of channels of sporting-event audio information, and the decoding means associates each of the plurality of channels of sporting-event audio information with a corresponding channel identifier. Each channel identifier distinguishes a corresponding channel of sporting-event audio information from other channels of sporting-event audio information. The interactive sporting event monitoring system further includes a user input for accepting a user-specified channel identifier from a user, and monitoring means for placing the channel of sporting-event audio information that the user desires to monitor in a format to facilitate monitoring thereof by a user. The video blanking interval data may further include telemetry data. The television channel selected by the tuning means comprises a first television channel, and the tuning means can comprise means for selecting a second television channel from the broad-band cable television signal or satellite input. At least one of the first television channel and the second television channel can comprise telemetry data.

These and other aspects of the present invention are apparent in the following detailed description and claims, particularly when considered in conjunction with the accompanying drawings in which like parts bear like reference numerals.

BRIEF DESCRIPTION OF THE DRAWINGS

FIG. 4 illustrates a block diagram of the telemetry acquiring and transmitting device of the presently preferred embodiment;

FIG. 5 illustrates a block diagram of the television-top decoder of the presently preferred embodiment;

DETAILED DESCRIPTION OF THE PRESENTLY PREFERRED EMBODIMENTS

Figure 1:
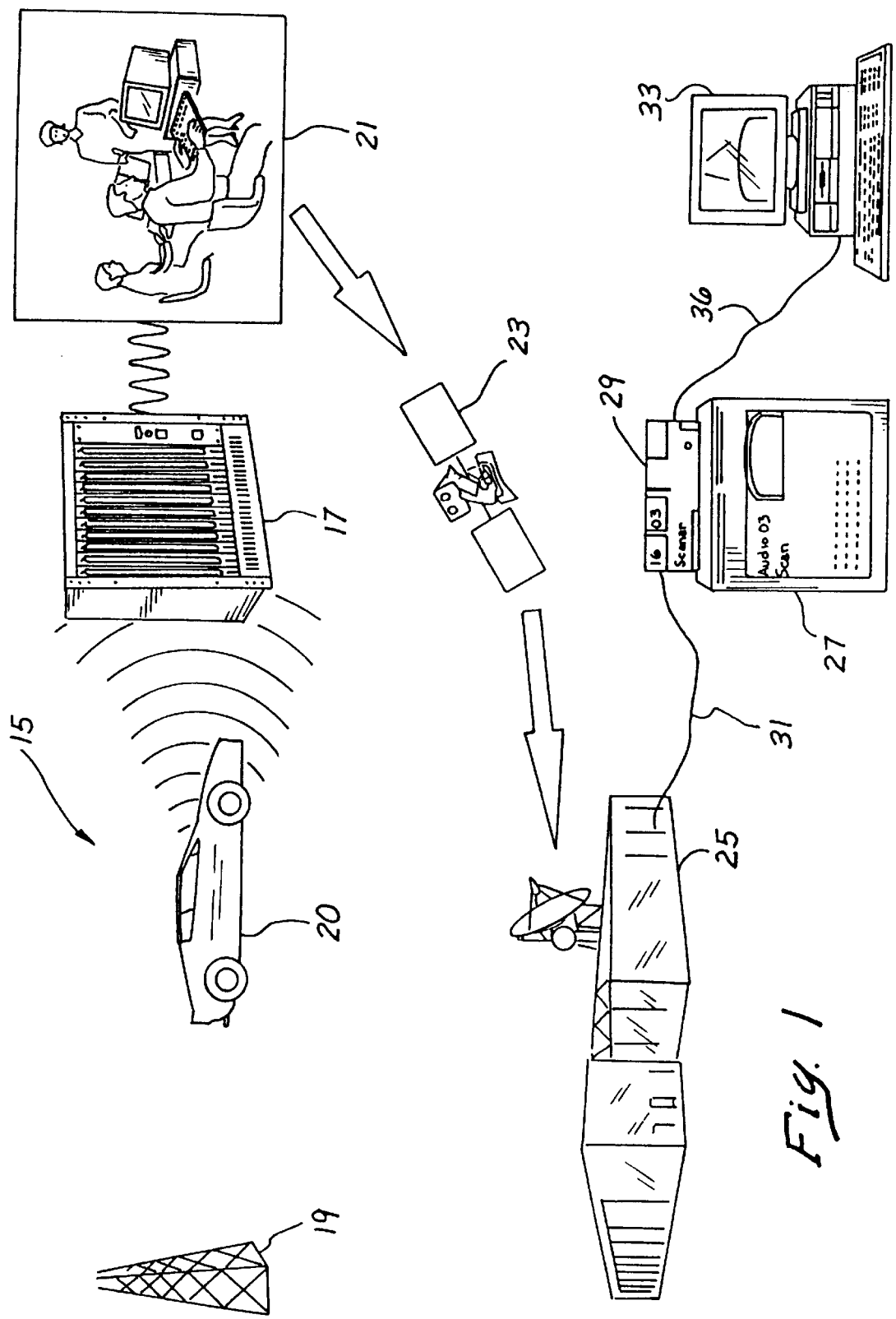
FIG. 1 illustrates a schematic diagram of the interactive sporting-event broadcast and monitoring system of the presently preferred embodiment.

Referring more particularly to the drawings, FIG. 1 illustrates a schematic diagram of the interactive monitoring system 15 of the presently preferred embodiment. The interactive monitoring system 15 comprises a data collection station 17, which receives radio transmissions from an event participant 20. In the presently preferred embodiment, the radio transmissions comprise UHF radio transmissions and the event participant 20 comprises a driver and a racing automobile. Other radio transmissions may be used such as, for example, VHF radio transmissions. Although the present invention is described in the specific context of an automobile-racing sporting event, the present invention can be applied to and encompasses virtually any sporting event having multiple contestants wherein each contestant comprises a radio-linked team, or any sporting event in which radios can be attached to the multiple contestants. According to one broad aspect of the present invention, the term "radio" is intended to encompass any device for transmitting and/or receiving information. For example, a micro-transmitter can be placed in the helmet of every football player in a professional football game or in the golf bag of a golfer in a golf tournament. The micro-transmitter may comprise transmitting and receiving capabilities or, alternatively, may comprise only transmitting capabilities. The radio transmissions comprise audio information and/or telemetry data, which may be transmitted and received between each player and the data collection station 17. In the case of each contestant having a radio-linked team, audio information and/or telemetry data is also transmitted and/or received between the player and his or her radio-linked team.

The audio information preferably comprises voice communications between the driver and his or her crew, and the telemetry data preferably comprises data transmitted in a real-time format from the automobile to the crew in order to enable analysis of machine and driver performance. The telemetry data preferably comprises key information including position information, speed information, engine revolutions-per-minute (rpm) information, lateral acceleration information, brake movement information, and throttle movement information corresponding to a particular racing automobile. In sporting events where event participants do not have radio-linked teams, the UHF radio transmissions can occur between one event participant and another event participant, or can comprise only sounds occurring in the immediate vicinity of the event participant during the event. Similarly, in sporting events where event participants do not have radio-linked teams, the telemetry data transmissions can occur between one event participant and another event participant, or can comprise only images or information seen or perceivable by the event participant during the sporting event.

In the presently preferred embodiment wherein telemetry data is transmitted and wherein the telemetry data comprises position information, a local global positioning satellite transmitter 19 can be incorporated for greater position accuracy. The local global positioning satellite transmitter 19 transmits local global positioning satellite information to each event participant 20. Global positioning satellite position information can still be generated by each event participant in the absence of the local global positioning satellite transmitter 19, but the position information is not as accurate. In embodiments where telemetry data is not transmitted or when accuracy is not required, the local global positioning satellite transmitter 19 can be omitted.

Audio information from each preferred embodiment 20 and/or audio information from the crew of each preferred embodiment 20 is formatted and forwarded to a television broadcasting facility 21. The television broadcasting facility 21 formats the data for broadcasting to a satellite 23. The satellite 23 forwards the data to a local cable television provider 25 (or to a home satellite receiver dish).

Cable service is provided from the local cable television provider 25 to cable subscribers. As shown in FIG. 1, for example, cable service is provided to a subscriber's television set 27 and to a television-top decoder 29 via line 31. The television-top decoder 29 receives the audio information and/or telemetry data from the line 31 and processes the audio information and/or telemetry data for monitoring by a user on the television set 27. An optional personal computer 33 can be connected to the television-top decoder 29 via line 36 for further processing of the audio information and/or telemetry data.

Figure 2:
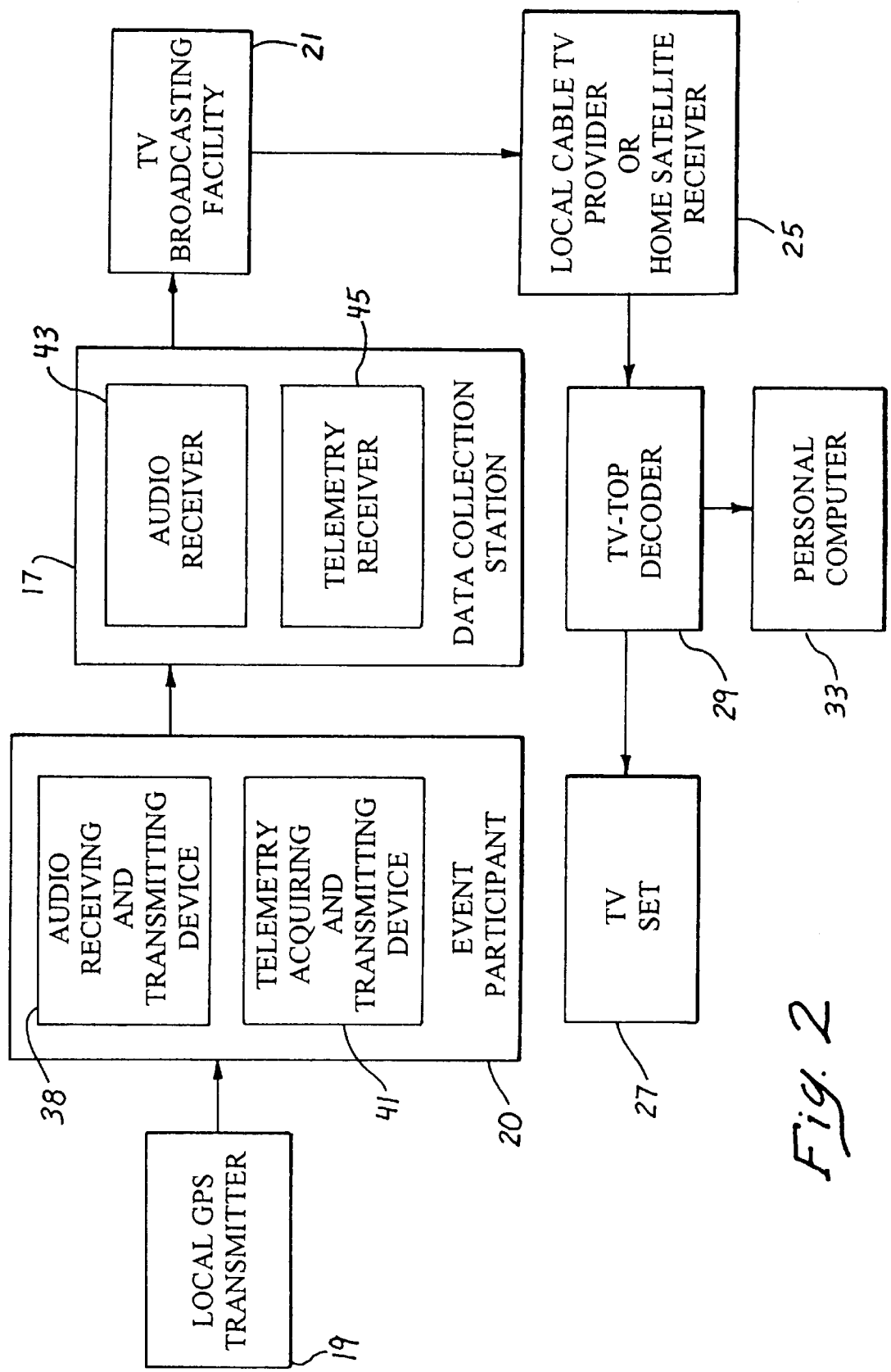
FIG. 2 illustrates a block diagram of the interactive sporting-event broadcast and monitoring system of the presently preferred embodiment.

FIG. 2 illustrates a block diagram of the interactive monitoring system 15. The preferred embodiment 20 comprises an audio receiving and transmitting device 38 and a telemetry acquiring and transmitting device 41. The audio receiving and transmitting device 38 receives audio communications from the crew of the event participant and transmits audio communications to the crew of the event participant. The telemetry acquiring and transmitting device 41 acquires and generates telemetry data, and transmits this telemetry data to the crew of the event participant. The data collection station 17 is shown in FIG. 2 comprising an audio receiver 43 and a telemetry receiver 45. As presently embodied, the data collection station 17 comprises an audio receiver 43 and a telemetry receiver 45 for each event participant. In an embodiment where telemetry data is not used, the telemetry acquiring and transmitting device 41 and the telemetry receiver 45 can be omitted for each event participant. Data from the audio receiver 43 and the telemetry receiver 45 is transmitted to the television broadcasting facility 21 and, subsequently, broadcast to a satellite 23 (FIG. 1). The local cable television provider 25 sends the audio information and/or the telemetry data to the television set 27 and television-top decoder 29 of a cable subscriber.

Figure 3:
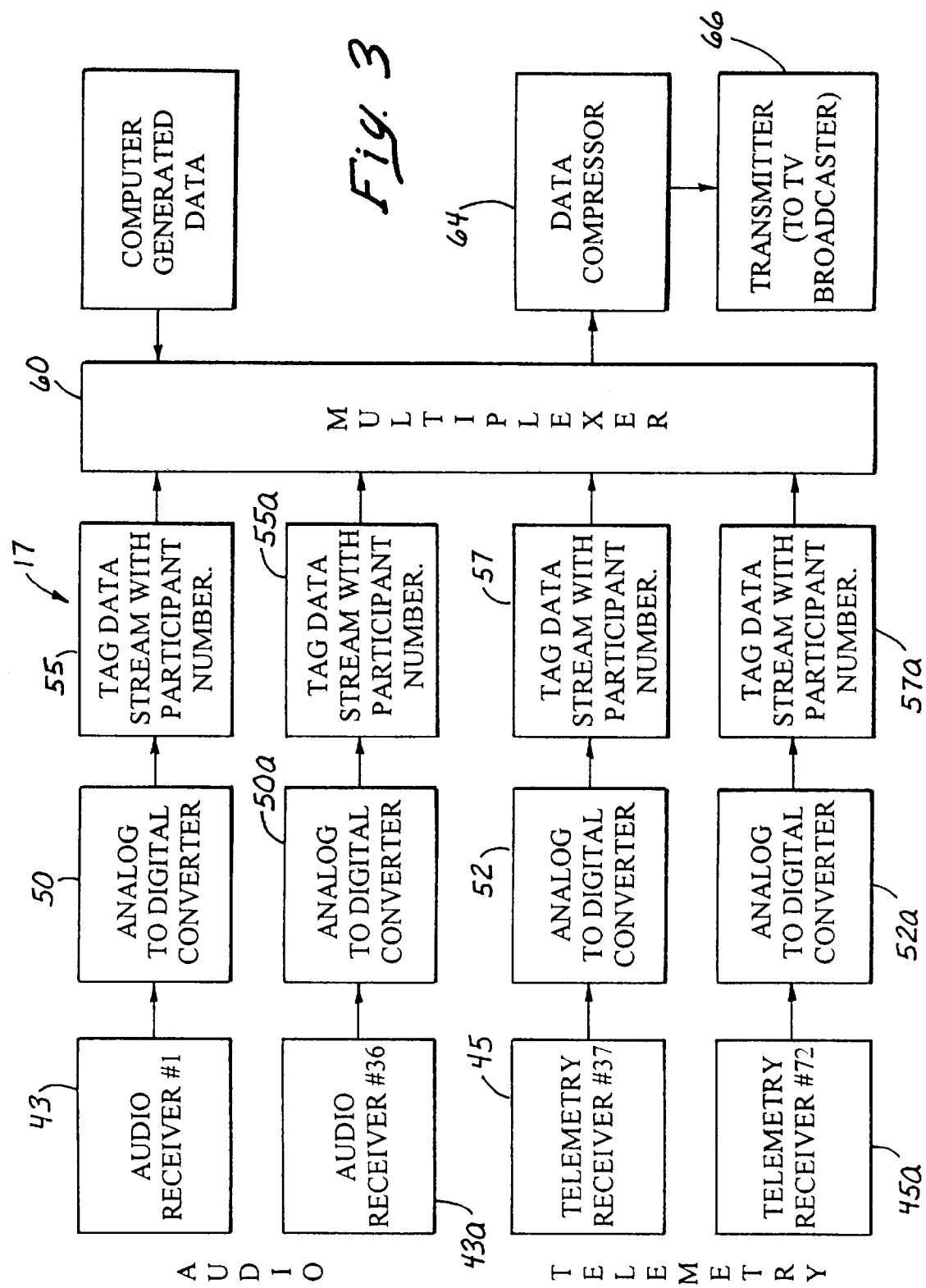
FIG. 3 illustrates a block diagram of the data collection station of the presently preferred embodiment.

The block diagram of FIG. 3 illustrates an exemplary configuration of the data collection station 17. The data collection station 17 is illustrated comprising 36 audio receivers and 36 telemetry receivers. Although 36 receivers are presently preferred, a greater or smaller number of receivers and corresponding components may be incorporated according to design parameters. The first of the 36 audio receivers is shown with the reference number 43, and the last of the 36 audio receivers is shown with the reference number 43a. Similarly, the first of the 36 telemetry receivers is shown with the reference number 45, and the last of the 36 telemetry receivers is shown with the reference number 45a. The audio information and the telemetry data from 36 event participants are simultaneously received into the data collection station 17 and, subsequently, fed into a corresponding bank of analog-to-digital converters within the data collection station 17. Audio information from the audio receiver 43 is fed to an analog-to-digital converter 50, and audio information from the audio receiver 43a is fed to an analog-to-digital converter 50a. Similarly, telemetry data from the telemetry receiver 45 is fed to an analog-to-digital converter 52, and telemetry data from the telemetry receiver 45a is fed to an analog-to-digital converter 52a.

The streams of digitized information, corresponding to the 36 channels of audio information and the 36 channels of telemetry data, are next fed to tagging circuits. The audio-information tagging circuits, such as shown at 55 and 55a, and the telemetry-data tagging circuits, such as shown at 57 and 57a, tag the corresponding streams of digitized information with the television-top attention prefix and a channel identifier. In the presently before embodiment, the channel identifier for each of the audio information streams comprises a number between 000 and 099, and the channel identifier for each of the telemetry data streams comprises a number between 100 and 199.

In addition to these 72 channels of audio information and telemetry data, corresponding to the 72 streams of digitized information, an additional channel (not shown) for computer-generated digital data streams is provided in accordance with the present invention for a variety of additional coded data to be supplied for real-time custom programming of the television-top decoder 29. Additionally, the channel for computer-generated data streams carries custom programming information and, further, can carry additional graphic data to be displayed on the television set 27. As presently embodied, the channel identifier number for the computer channel is the number 999. The 72 channels and the one computer channel are all fed to the multiplexer 60. Subsequently, data compression can be performed by the data compressor 64, if required. A transmitter 66 receives the multiplexed data from the multiplexer 60 and, optionally, to the data compressor 64. The resulting digital information is transmitted to the television broadcasting facility 21 by the transmitter 66.

The television broadcasting facility 21 receives the digital information from the transmitter 66 of the data collection station 17. The received digital information is transmitted by the television broadcasting facility 21 by insertion of the digital information into a video blanking interval of a television channel within a broad-band cable television signal. Conventional technology can be used to insert the digital information into the video blanking interval. Such conventional technology exists in the area of inserting closed-caption information into video blanking intervals of television channels. A first portion of the digital information of the present invention is preferably inserted into the video blanking interval of a television channel, which is currently carrying the broadcast of the sporting event, in any conventional format. The second portion of the digital information is preferably inserted into a secondary television channel of the broad-band cable television signal, that is dedicated exclusively for digital data transmission. In an alternative embodiment, only active digital information is transmitted and, accordingly, the secondary television channel is not required. According to this alternative embodiment, only 8, for example, of the 36 audio information channels may be active at any given time so that only the eight active channels are transmitted. Moreover, according to this alternative embodiment, sporting events having fewer than 36 contestants do not require transmission of all of the 72 channels.

FIG. 4 illustrates a block diagram of the telemetry acquiring and transmitting device 41, which was described above with reference to FIG. 2. The telemetry acquiring and transmitting device 41 comprises a plurality of sensors 71 for collecting local global positioning satellite data including latitude, longitudinal, and altitude from global positioning satellites and from an optional local global positioning satellite transmitter. The plurality of sensors 71 also collect data relating to speed, magnetic heading, lateral acceleration, engine revolutions per minute, throttle position, break position, gear selected, and option parameter. The plurality of sensors 71 convert any analog data to digital form and output the digital data in parallel form to a digital multiplexer 74. The digital multiplexer 74 preferably multiplexes the data two times per second. Multiplexed data from the digital multiplexer 74 is output to the radio transmitter 77, which preferably continuously transmits data via either VHF or UHF radio.

FIG. 5 illustrates a block diagram of the television-top decoder 29 of the presently preferred embodiment. The television-top decoder 29 can be programmed remotely by digital information included in the video blanking interval portion of a television channel. The programming information for programming the television-top decoder 29 can be used to configure the television-top decoder 29 in various ways to accompany various types of television programming, sporting events and monitoring protocols. Alternatively, the television-top decoder 29 can be programmed remotely by digital information included in the secondary television channel. The television-top decoder 29 can be remotely programmed, for example, at the beginning of a program, updated during the program or re-programmed many times during the program, according to the preferences of the television programming personnel. The television-top decoder 29 can also be programmed by using optional PCMCIA cards, for example.

A cable television input 82 receives a broad-band cable television signal from the line 31 (FIG. 1). The cable television input 82 outputs the broad-band cable television signal to a first television tuner 84 and to a second television tuner 86. The first television tuner 84 selects a first television channel from the broad-band cable television signal, and the second television tuner 86 selects a second television channel from the broad-band cable television signal or satellite signal. The first television channel is preferably the same television channel to which the event is being broadcasted in order to allow simultaneous viewing of the broadcast sporting event program and monitoring of video blanking interval digital information.

The first television tuner 84 determines the first television channel to be selected (the video broadcast) and the second television tuner 86 determines the second television channel to be selected (additional digital data is required). The user inputs information relating to the first television channel and the second television channel into the television-top decoder 29 by using a remote control 88 (FIG. 6c). In the presently preferred embodiment, all user-controllable functions of the television-top decoder 29 will be controlled by a user with the remote control 88. The infrared remote control sensor 90 receives the user instructions from the remote control 88 and forwards the user instructions to the microprocessor 92 via a data bus 95. The microprocessor 92 instructs the first television tuner 84 via line 98 to select the first television channel, and instructs the second television tuner 86 via line 101 to select the second television channel. The second television tuner 86 is not required in embodiments where additional digital information is not carried on the second television channel.

The broad-band cable television signal is passed from the first TV tuner 84 in an unmodified state to the video mixer 103 via line 105. Additionally, the first television channel, selected by the first television tuner 84, is forwarded in an unmodified state both to the video mixer 103 via line 108 and to the video switch 110 via line 112. The second television tuner 86 forwards the second television channel to the video switch 110 via line 113. The video blanking interval data decoder 115 receives the first television channel and the second television channel from the video switch 10. The video blanking interval data decoder 115 determines whether encoded data is present in lines 10 through 20 of the video blanking interval of the first television channel, as presently embodied. In the presently preferred embodiment, the encoded data that would need to be present in lines 10 through 20 of the video blanking interval comprises a television-top attention prefix, which was previously discussed above. If the television-top attention prefix is present in the video blanking interval, then the microprocessor 92 processes the digital information in the video blanking interval using default mode settings, user-modified mode settings, or real-time reprogrammed mode settings. The video blanking interval data decoder 115 decompresses the video blanking interval data, if required and, additionally, passes the video blanking interval data to the serial output 120 for optional additional processing. The video blanking interval data decoder 115 processes digital information in the second television channel in a similar manner, when the second television channel is used. The serial output 120 connects the television-top decoder 29 to the personal computer 33 via line 36 (FIG. 1).

Streams of digitized information having the television-top attention prefix and having a channel identifier between 000 and 099 are treated by the VBI data decoder 115 as audio information streams. The television-top decoder 29 is operable in several modes, including a scan mode, a hold mode, and a mute mode. In the scan mode, the video blinking interval data decoder 115 sends a first active channel of audio information, corresponding to a first sporting-event contestant, to the digital-to-analog converter 122 via the data bus 95. If the first channel of audio information is inactive, then the video blanking interval data decoder 115 instead determines whether the second channel of audio information, corresponding to a second sporting-event contestant, is active. A channel of audio information is active when audio communications between the corresponding sporting event contestant and his or her crew are occurring on the channel of audio information. If the second channel of audio information is active, then the video blanking interval data decoder 115 sends the second channel of audio information to the digital-to-analog converter 122. Channels of audio information sent to the digital-to-analog converter 122 are converted to analog signals and, subsequently, passed to the audio amplifier 127. The audio amplifier 127 outputs amplified analog signals to both the audio output 129 and the headphone output 131. The level of volume at the audio output 129 and/or the headphone output 131 can be adjusted by the remote control 88 (FIG. 6c).

The amplified analog signals are also passed to the video mixer 103 via line 134. When the amplified analog signals are passed to the video mixer 103, the amplified analog signals replace the broadcast audio on the first television channel. The broadcast audio on the first television channel corresponds to the audio which the television set 27 would normally use in the absence of the television-top decoder 29. In the scan mode, the video blanking interval data decoder 115 consecutively scans the first through thirty-sixth channels of audio information for active channels and sequentially forwards each active channel of audio information to the digital-to-analog converter 122. The amplified analog signals do not replace the broadcast audio on the first television channel when the television-top decoder 29 is in the mute mode, which can be selected using the remote control 88. When the channel of audio information being amplified by the audio amplifier 127 is inactive for greater than one second, the microprocessor 92 routes the next highest active channel of audio information to the digital-to-analog converter 122, unless the user has selected the hold mode. The audio event channel selector, which displays the channel of audio information currently being amplified by the audio amplifier 127, resets to 000 after incremitting past 099. If at anytime the user directly enters a number corresponding to a channel of audio information that the user desires to monitor (audio entry mode), the microprocessor 92 immediately passes the corresponding channel of audio information to the digital-to-analog converter 122 and holds on that channel of audio information.

Streams of digitized information having the television-top attention prefix and having a channel identifier between 100 and 199 are treated by the video blanking interval data decoder 115 as telemetry data streams. Telemetry data includes parametric data from automobile engines, contestants, etc. The parametric data is forwarded from the video blanking interval data decoder 115 to the microprocessor 92 via the data bus 95, and is processed by the microprocessor 92. The parametric data processed by the microprocessor 92 is forwarded to the video generator 140. Processed parametric data from the microprocessor 92 is displayed on the television set 27 (FIG. 1) in a format, which is dictated by either (1) real-time custom programming information from a computer channel having a television-top attention prefix and a channel identifier number of 999, (2) PCMCIA programming information, or (3) default mode settings. Telemetry data can be treated as either alphanumeric information or graphic information. Additionally, telemetry data can be treated as another video source and overlayed onto the television picture, similarly to picture-in-picture technology. Video overlays are generated from the telemetry data by the video generator 140 for display over the broadcast video of the first television channel. The video overlays are placed over the broadcast video of the first television channel in such a way that the broadcast video operates as a background for the video overlays on the television set 27. The video overlays are generated by the video generator 140 under the supervision and control of the microprocessor 92. The video overlays from the video generator 140 are passed to the video mixer 103 and are subsequently output to the television set 27 via the output 104.

In the default mode, the telemetry data is not displayed over the broadcast video of the first television channel. A user can select the telemetry mode in order to display the telemetry data over the broadcast video of the first television channel. The telemetry data can be viewed in a scan mode, a hold mode, and a direct channel mode, similarly to the monitoring modes provided for monitoring of the audio information.

Streams of digitized information having the television-top attention prefix and having a channel identifier of 999 are treated by the video blanking interval data decoder 115 as custom programming information streams. The custom programming information can operate to reconfigure or reprogram the television-top decoder 29 to process audio information and telemetry data in a way tailored to a particular TV program or sporting event being broadcast or a particular segment of a sporting event being broadcast. Custom programming information may also be facilitated by other means such as a PCMCIA hardware module 150, for example. The PCMCIA hardware module can provide customized personality configurations and can provide additional hardware functionality for future applications and program adaptions. The customized personality configurations of the PCMCIA cards can include deciphering routines for security measures and for preventing software theft.

The infrared remote control sensor 90 receives instructions from the remote control 88 (FIG. 6c) and passes the received instructions to the microprocessor 92 via the data bus 95. Instructions received by the infrared remote control sensor 90 are handled by the microprocessor 92 as interrupts and processed immediately. The status light emitting diodes and channel indicators 152 are controlled by the microprocessor 92.

The television-top decoder 29 of the present invention can extract digital and analog information from the video blanking interval portion of the first television channel and from the second television channel; can decompress the digital data; can perform error handling on the digital data; and can de-multiplex simultaneous channels of information while maintaining channel number identity of each stream of channel information corresponding to each event participant. The television-top decoder 29 can allow for sequential scanning of all channels of information, similarly to a UHF scanner radio positioned to at the sporting event, and can allow for random direct access to any specific channel. The television-top decoder 29 can further treat coded portions of the first television channel or the second television channel as sound and convert the coded portions from digital to analog for subsequent audio monitoring by a user. The television-top decoder 29 provides the user with an option of muting the audio associated with the broadcast television channel covering the sporting event and, instead, using audio from audio information on either the video blanking interval of the first television channel or the second television channel. The audio associated with the broadcast television channel is unaffected when neither the video blanking interval of the first television channel nor the second television channel contains audio information.

Figure 6A:
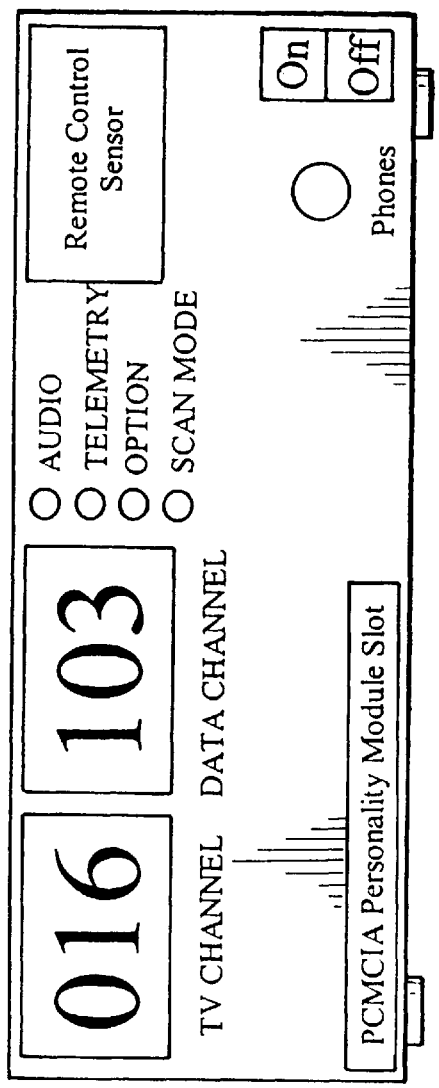
FIG. 6a illustrates a side-elevational view of the display side of the television-top decoder device in accordance with the presently preferred embodiment.
Figure 6B:
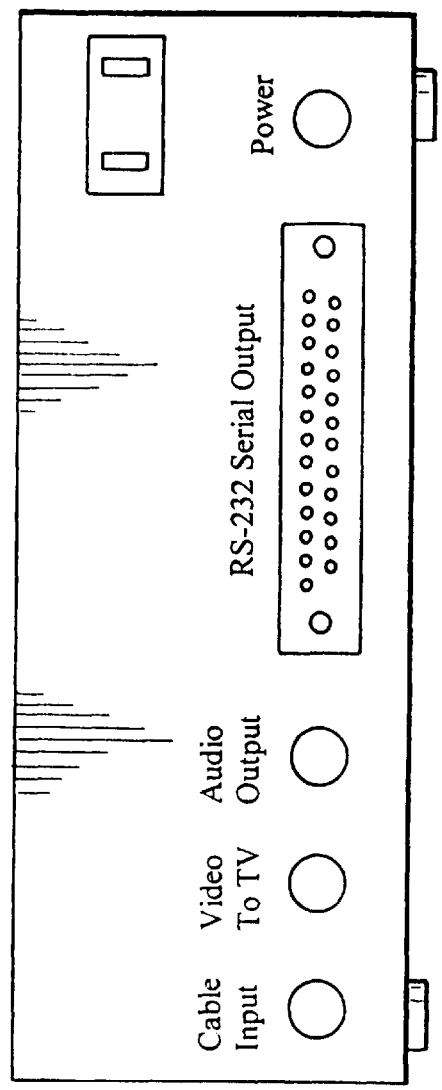
FIG. 6b illustrates a side-elevational view of the connection side of the television-top decoder device in accordance with the presently preferred embodiment.
Figure 6C:
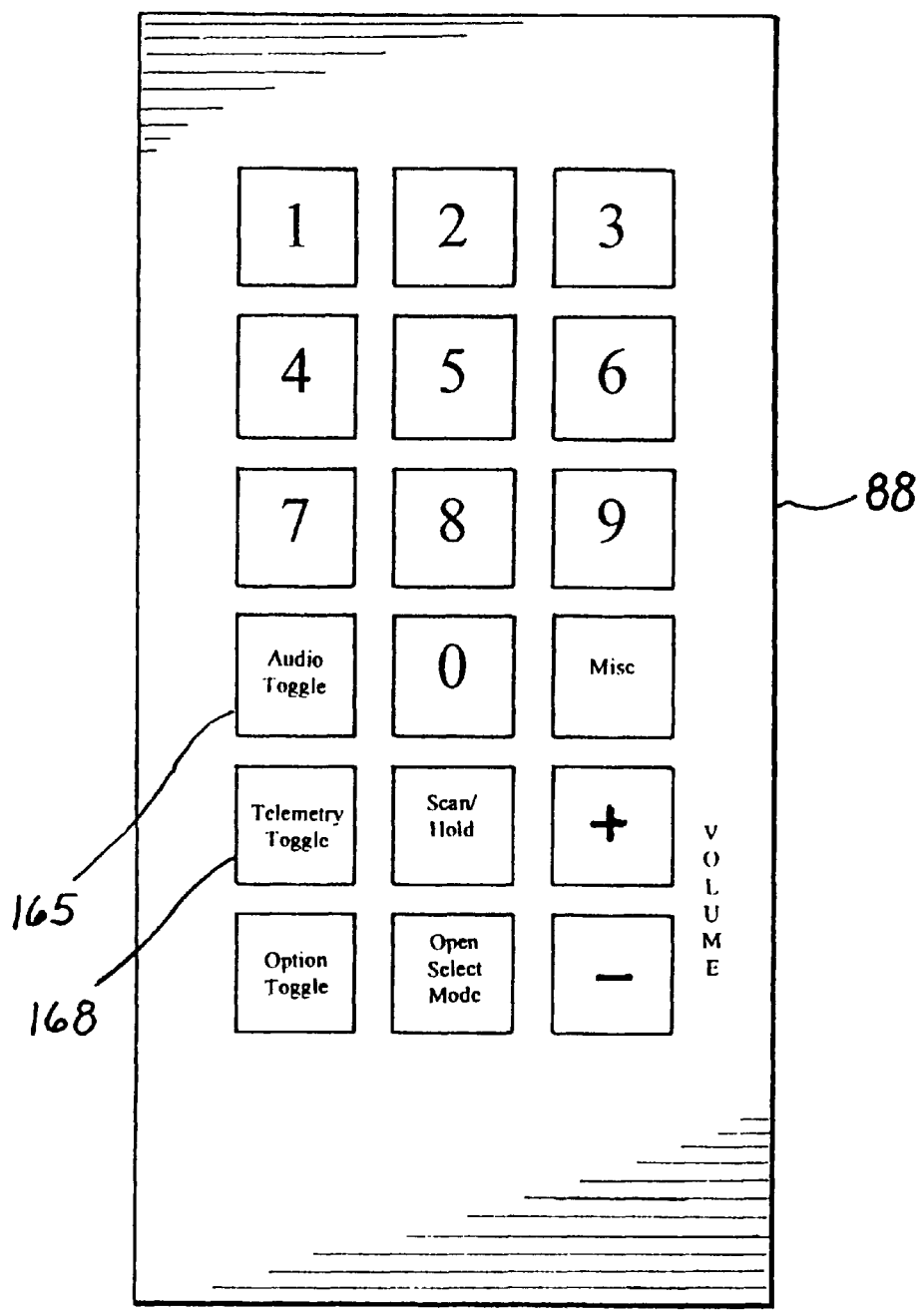
FIG. 6c illustrates a top-elevational view of a remote control for use with the television-top decoder device in accordance with the presently preferred embodiment.

FIG. 6a illustrates a side-elevational view of the display side of the television-top decoder device, and FIG. 6b illustrates a side-elevational view of the connection side of the television-top decoder device of the presently preferred embodiment. When a user initially presses the on button, the microprocessor 92 will boot-up using instructions stored in the boot-up ROM 160 (FIG. 5). If a PCMCIA card is in place, the microprocessor 92 will determine the nature of the card and determine if any additional software instructions are contained on the card and incorporate them into the logic of the software function. Upon boot up, all of the hardware in the television-top decoder 29 will be initialized with default mode settings. All of the status light emitting diode's will be turned on until the boot up and self test is complete. If a fault occurs, the fault code will flash on and off on the status light emitting diodes.

Figure 7:
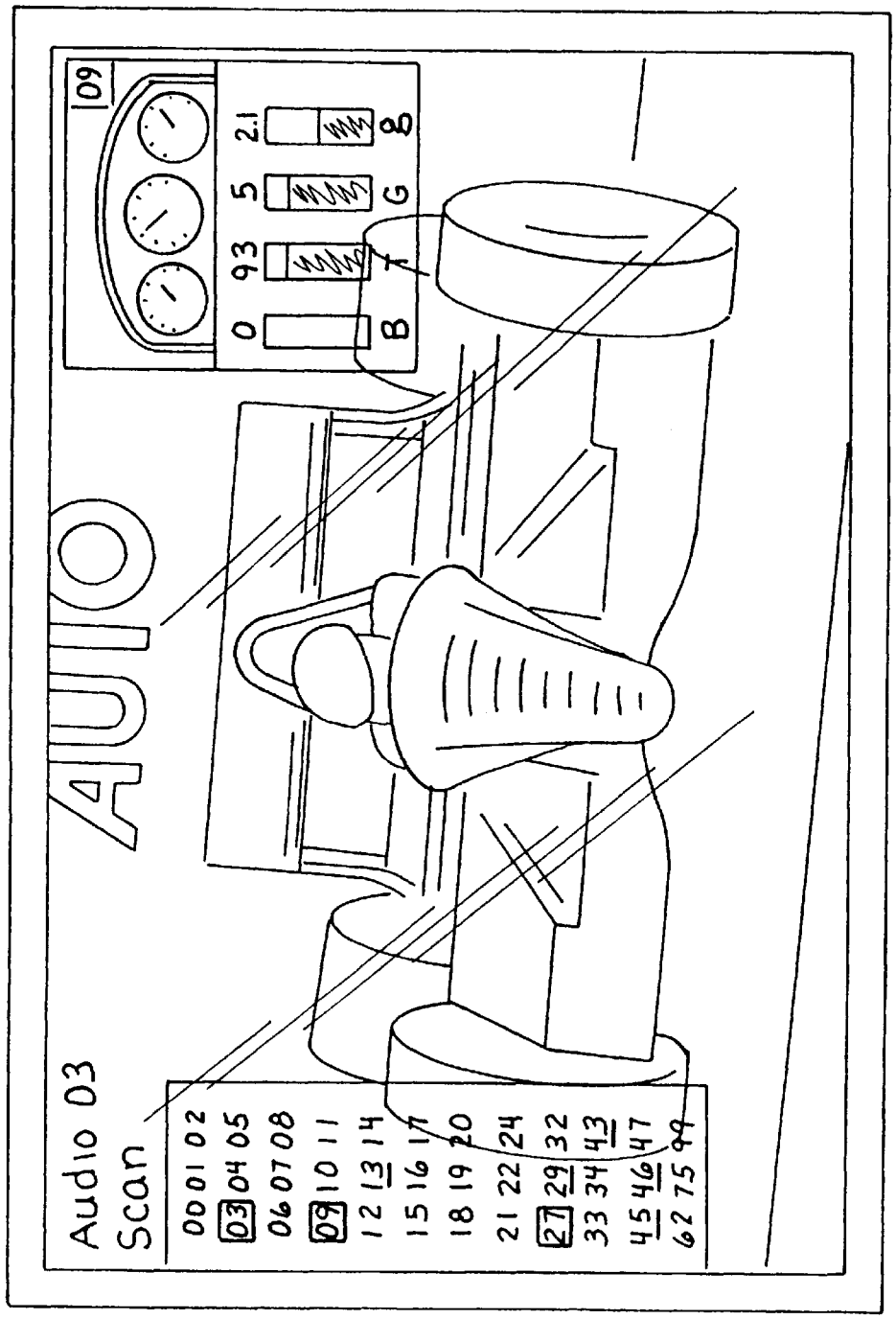
FIG. 7 illustrates a side elevation view of a television screen display generated by the interactive sporting-event broadcast and monitoring system of the presently preferred embodiment.

FIG. 7 illustrates a television display overlay displayed on a viewing screen of the television set 27. The microprocessor 92, in conjunction with the video generator 140, dictates the nature of the television display overlay. The television display overlay can be modified by user inputs from the remote control 88 shown in FIG. 6c. In the presently preferred embodiment, all overlays appear over the broadcast video picture. In the initial default mode of the television overlay display, three items of mode information appear in the top left-hand quarter of the television screen. These three items of mode information include (1) the event channel select mode which can be either audio, telemetry, or other; (2) the active event channel and the mode selected; and (3) the scan or hold mode.

The side elevation view of the television screen display shown in FIG. 7 is generated in real-time by the interactive sporting-event broadcast and monitoring system of the presently prefered embodiment. By pressing the audio toggle button 165 on the remote control 88 (FIG. 6c), all of the channel numbers that have had any transmission activity will be displayed on the left-hand side of the television screen. This information will be updated once every second. Any channel that is currently active in the audio spectrum will be color coded and underlined. Any channel that is active in the telemetry spectrum will be surrounded by a square. This feature allows the user to direct access channels of interest when they are active, versus having to wait for the scan mode to pick up the activity. The position of this display can be changed by pressing the audio toggle button 165 on the remote control 88. The toggle sequence for the audio toggle button 65 is as follows: mode status on top left of screen (default); channel activity and mode status on left side of screen; channel activity and mode status on bottom of screen; and mode status and channel activity display off. By pressing the telemetry toggle button 168 on the remote control 88 for the first time, telemetry data for the selected telemetry event channel will be displayed graphically in the upper right hand corner of the screen. The position of this display can be changed by pressing the telemetry toggle button on the remote control 88. The toggle sequence is as follows: telemetry display on for selected telemetry channel in upper right hand comer of the screen; telemetry display on for selected telemetry channel in lower right hand corner of the screen (will move audio channel data to left side of the screen if located at the bottom); and the default is telemetry display off.

The serial output 120 of the television-top decoder 29 can facilitate simultaneous display of all of the telemetry data from all of the broadcasting race teams. In the presently preferred embodiment, all video blanking interval decoded digital data and any decoded digital data from the second television channel are passed to the serial output 120 for external computer processing. The serial output 120 preferably comprises an RS-232 serial port. Real-time fastest lap times and speeds and a large quantity of real-time race statistics can be generated and displayed. A near video quality three-dimensional model of the actual racetrack and all of the competing vehicles can be generated using the telemetry data and a commercially available personal computer racing simulation software package. Using the real-time telemetry data from the television-top decoder 29 and the racing simulation software, a real-time virtual reality of the actual sporting event can be generated. The virtual reality simulation of the sporting event can be viewed by the user from any vantage point above or level with the racetrack. Using the computer racing simulation software, a user can insert himself or herself into the virtual reality of the sporting event to participate with the actual competitors in real-time. All of the telemetry data can be saved, and a user can perform simulations and conduct the event again with a different vehicle or strategy at a later time. The user can perform instant replays using the personal-computer based near video quality virtual reality from any position on or above the racetrack, at any angle, and from any event participant as many times as desired immediately after a particular incident or after the event has been completed.

While this invention has been described with respect to various specific examples and embodiments, it is to be understood that the invention is not limited thereto and that it can be variously practiced within the scope of the following claims.

What is claimed is:

1. An interactive sporting event monitoring system for facilitating monitoring of a live sporting event wherein spectators at the sporting event can identify one or more contestants by contestant identifiers, each of a plurality of the one or more contestants having a radio transmitter on a distinct transmitting frequency for transmitting audio information to a data receiving station, the data receiving station comprising a plurality of radio receivers wherein each radio receiver is tuned to a corresponding contestant's radio transmitter, wherein each radio receiver's audio output is digitized and digitally tagged with the corresponding contestant identifier, the interactive sporting event monitoring system comprising:

tuning means for selecting a television channel, the television channel comprising one or more channels of sporting-event audio information, wherein each of the one or more channels of sporting-event audio information is encoded with a corresponding channel identifier distinguishing that channel from other channels;

detecting means for detecting the one or more channels of sporting-event audio information on the television channel, the detecting means being for associating each of the one or more channels of sporting-event audio information with its corresponding channel identifier, each channel identifier including a corresponding contestant identifier and each of the one or more channels of sporting-event audio information including audio information of the contestant identified by the corresponding contestant identifier;

a user input adapted to accept a user-specified channel identifier from a user, the user-specified channel identifier specifying a channel of sporting-event audio information that the user desires to monitor; and monitoring means for placing the channel of sporting-event audio information that the user desires to monitor in a format to facilitate monitoring thereof by a user.

2. The interactive sporting event monitoring system as recited in claim 1, wherein the monitoring means comprises display means for visually displaying information relating to a plurality of channels of sporting-event audio information.

3. The interactive sporting event monitoring system as recited in claim 2, wherein the display means visually displays channel identifiers that have had transmission activity.

4. The interactive sporting event monitoring system as recited in claim 3, wherein the display means displays the contestant identifier associated with each channel identifier being displayed.

5. The interactive sporting event monitoring system as recited in claim 3, wherein the display means displays, in a visually distinctive format relative to other channel identifiers being displayed, those channel identifiers that currently have transmission activity.

6. The interactive sporting event monitoring system as recited in claim 5, wherein the display means displays only the channel identifiers that have had transmission activity since the user began monitoring the sporting event.

7. The interactive sporting event monitoring system as recited in claim 6, wherein the display means displays the contestant identifier associated with each channel identifier being displayed.

8. The interactive sporting event monitoring system as recited in claim 7, wherein the display means displays the contestant identifier as the channel identifier, for each channel identifier being displayed by the display means.

9. The interactive sporting event monitoring system as recited in claim 8, wherein the user input is a remote control.

10. The interactive sporting event monitoring system as recited in claim 2, wherein the monitoring means comprises means for visually indicating the channel of sporting-event audio information that the user desires to monitor in a format that is visually distinctive over the information relating to the plurality of channels on the display means.

11. The interactive sporting event monitoring system as recited in claim 1, wherein:
the television channel selected by the tuning means comprises a first television channel; and
the tuning means comprises means for simultaneously selecting a second television channel, the second television channel comprising a standard commercial video and audio broadcast of the sporting event.

12. The interactive sporting event monitoring system as recited in claim 1, wherein the user input is a remote control.

13. The interactive sporting event monitoring system as recited in claim 1, wherein the display means visually displays channel identifiers that have had transmission activity.

14. The interactive sporting event monitoring system as recited in claims 1, wherein the monitoring means is adapted to display information to allow the user to select among audio and telemetry modes.

15. The interactive sporting event monitoring system as recited in claim 1, wherein
the television channel comprises a video blanking interval; and
the video blanking interval comprises at least one of the one or more channels of sporting event audio information.

16. An interactive sporting event monitoring system for facilitating monitoring of a sporting event wherein spectators at the sporting event can identify contestants by contestant identifiers, the interactive sporting event monitoring system comprising:

tuning means for selecting a television channel, the television channel comprising a plurality of channels of telemetry information, wherein each of the plurality of channels of telemetry information is encoded with a corresponding channel identifier distinguishing that channel from other channels;
detecting means for detecting the plurality of channels of telemetry information on the television channel, the detecting means being adapted to associate each of the plurality of channels of telemetry information with its corresponding channel identifier, each channel identifier including a corresponding contestant identifier and each of the plurality of channels of telemetry information including telemetry information of the contestant identified by the corresponding contestant identifier;
a user input adapted to accept a user-specified channel identifier from a user, the user-specified channel identifier specifying a channel of telemetry information that the user desires to monitor; and
monitoring means for placing the channel of telemetry information that the user desires to monitor in a format to facilitate monitoring thereof by a user.

17. The interactive sporting event monitoring system as recited in claim 16, wherein each of the plurality of telemetry data channels comprises at least one of speed data, position data, magnetic heading data, engine revolutions per minute (RPM) data, lateral acceleration data, throttle position data, brake on/off data, and gear data that corresponds to the particular contestant.

18. The interactive sporting event monitoring system as recited in claim 16, wherein the monitoring means comprises means for constructing a virtual reality sporting-event environment and for generating a virtual-reality contestant within the virtual reality sporting-event environment, the monitoring means generating the virtual-reality contestant based upon at least one of the data, position data, magnetic heading data, engine revolutions per minute (RPM) data, lateral acceleration data, throttle position data, brake on/off data, and gear data that corresponds to a particular contestant.

19. The interactive sporting event monitoring system as recited in claim 18, wherein the monitoring means is adapted to display information to allow the user to view, from within the virtual reality sporting-event environment, the sporting event from any vantage point on or above the field of play.

20. The interactive sporting event monitoring system as recited in claim 19, wherein the monitoring means is adapted to display information to allow the user to view, from within the virtual reality sporting-event environment, the sporting event from a vantage of any participant of the sporting event.

21. The interactive sporting event monitoring system as recited in claim 18, wherein the interactive sporting event monitoring system is adapted to store telemetry data to provide instant replays, using the virtual reality sporting-event environment, from any angle and position on or above the field of play.

22. The interactive sporting event monitoring system as recited in claim 16, wherein the user input is a remote control.

23. The interactive sporting event monitoring system as recited in claim 16, wherein the monitoring means comprises display means for visually displaying information relating to a plurality of channels of telemetry information, and further comprises means for visually indicating the channel of telemetry information that the user desires to monitor in a format that is visually distinctive over the information relating to the plurality of channels on the display means.

24. The interactive sporting event monitoring system as recited in claim 23, wherein the display means visually displays channel identifiers that have had transmission activity.

25. The interactive sporting event monitoring system as recited in claim 24, wherein the display means displays the contestant identifier associated with each channel identifier being displayed.

26. The interactive sporting event monitoring system as recited in claim 25, wherein the display means displays, in a visually distinctive format relative to other channel identifiers being displayed, those channel identifiers that currently have transmission activity.

27. The interactive sporting event monitoring system as recited in claim 26, wherein the display means displays only the channel identifiers that have had transmission activity since the user began monitoring the sporting event.

28. The interactive sporting event monitoring system as recited in claim 27, wherein the display means displays the contestant identifier associated with each channel identifier being displayed.

29. The interactive sporting event monitoring system as recited in claim 28, wherein the display means displays the contestant identifier as the channel identifier, for each channel identifier being displayed by the display means.

30. The interactive sporting event monitoring system as recited in claim 29, wherein the user input is a remote control.

31. The interactive sporting event monitoring system as recited in claim 18, wherein the interactive sporting event monitoring system is adapted to generate and display real-time statistics for contestants in the sporting event.

32. The interactive sporting event monitoring system as recited in claim 16, wherein the interactive sporting event monitoring system is adapted to allow the user to insert himself or herself into a virtual reality of the sporting event to participate with the actual competitors in real time.

33. The interactive sporting event monitoring system as recited in claim 16, wherein the interactive sporting event monitoring system is adapted to allow the user to insert himself or herself into a virtual reality of the sporting event to participate with the actual competitors in a virtual re-creation of the sporting event alter the sporting event has concluded.

34. The interactive sporting event monitoring system as recited in claim 16, wherein the television channel comprises a video blanking interval; and the video blanking interval comprises at least one of the plurality channels of telemetry information.

35. The interactive sporting event monitoring system as recited in claim 16, wherein the monitoring means comprises means for constructing a virtual reality sporting-event environment comprising virtual contestants, wherein movement of the virtual contestants are based on telemetry data streams transmitted from the live sporting event and wherein the user can enter the virtual reality sporting-event environment and participate in the virtual sporting event.

36. The interactive sporting event monitoring system as recited in claim 1 or 16, wherein the interactive sporting event monitoring system is adapted to allow regular broadcast video and audio programming to be viewed in conjunction with over-laid or picture-in-picture graphics and over-laid audio from the real-time sporting event contestant audio and telemetry data streams.

\* \* \* \* \*